Patented May 27, 1952

2,597,843

UNITED STATES PATENT OFFICE 2,597,843

CYCLOPENTENYL CARBINOLS

Carl B. Linn, Riverside, Ill., assignor to Universal Oil Products Company, Chicago, Ill., a corporation of Delaware No Drawing. Application May 9, 1950, Serial No. 161,013

10 Claims. (Cl. 260—617)

This invention relates to a new and useful class of cycloalkenyl carbinols, particularly certain pentamethylcyclopentenyl carbinols and to a process for preparing them.

An object of this invention is to provide a novel class of cycloalkenyl carbinols, particularly pentamethylcyclopentenyl carbinols in which a double bond is present in the 5-carbon atom ring, said compounds being suitable for use as intermediates in organic synthesis as in the production of esters of organic and inorganic acids, in the production of halides by the addition of a hydrogen halide to the olefinic double bond and/or to the hydroxyl group of the carbinol, and in the oxidation of such unsaturated cyclic carbinols to form carbonyl compounds, particularly di-ketones.

The pentamethylcyclopentenyl carbinols of this invention are also useful as starting materials in the production of plastics and drying oils, and in the formation of thermal co-polymers with other unsaturated compounds such as olefins, di-olefins and the like.

One specific embodiment of this invention is a pentamethylcyclopentenyl carbinol having the structural formula

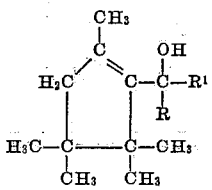

wherein R represents a member of the group consisting of hydrogen and an alkyl group and $R^1$ represents a member of the group consisting of an alkyl group, a cycloalkyl group and an aryl group.

Another embodiment of this invention is a pentamethylcyclopentenyl carbinol having the structural formula

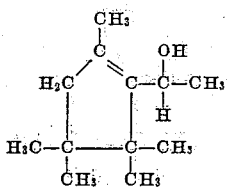

A further embodiment of this invention is a pentamethylcyclopentenyl carbinol having the structural formula

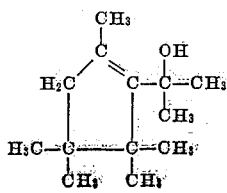

An additional embodiment of this invention is a carbinol having a structure represented by one of the formulae

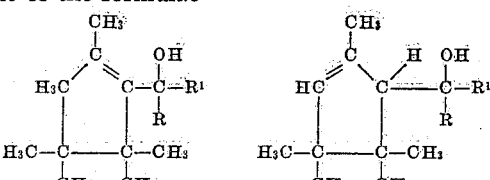

and

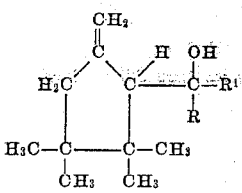

wherein R represents a member of the group consisting of hydrogen and an alkyl group and $R^1$ represents a member of the group consisting of an alkyl group, a cycloalkyl group and an aryl group.

I have found that desoxymesityl oxide with the formula

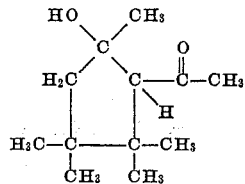

is a convenient starting material for the production of a pentamethylcyclopentenyl carbinol containing a cyclopentene ring in which two adjacent nuclear carbon atoms are combined with geminal methyl groups, that is, each of these adjacent nuclear carbon atoms is combined with two methyl groups. Such polymethylated cyclopentenyl carbinols also contain another methyl group combined with the other nuclear carbon atom that is adjacent to the nuclear carbon atom which is combined with the carbinol side chain. This carbinol side chain contains at least two carbon atoms and has the hydroxyl group bound to the carbon atom which is adjacent to the cyclopentenyl ring.

Thus a pentamethylcyclopentenyl carbinol which is a compound of this invention is obtained by utilizing desoxymesityl oxide as a starting material for the series of reactions represented by the following equations:

(1) 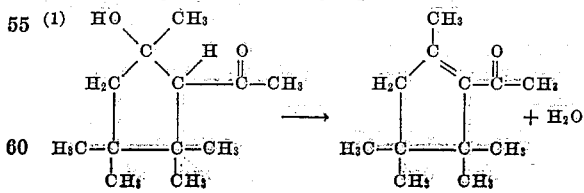

(2) 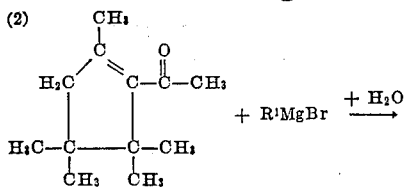

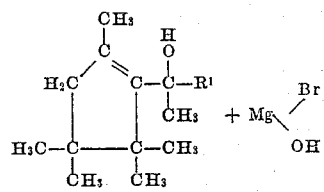

In the Grignard reaction represented by equation (2), the hydrocarbon group represented by $R^1$ is a member of the group consisting of an alkyl group, a cycloalkyl group, and an aryl group. Thus when $R^1$ represents a methyl group, the Grignard reaction between the dehydration product of desoxymesityl oxide and methyl magnesium bromide results in the production of pentamethylcyclopentenyldimethyl carbinol.

Desoxymesityl oxide which is used as a starting material for producing the pentamethylcyclopentenyl carbinols of this invention is produced by reacting mesityl oxide with an aluminum-mercury couple in wet ether solution whereby a condensation occurs which is represented by the following equation:

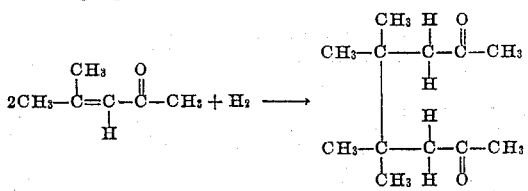

The resultant di-ketone apparently undergoes an internal aldol condensation to give desoxymesityl oxide which is represented by the formula

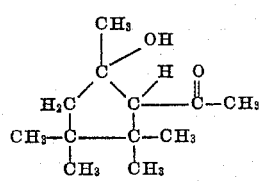

The pentamethylcyclopentenylmethyl ketone which is produced as a dehydration product of desoxymesityl oxide is then reacted with methyl magnesium bromide or another $R^1MgBr$ in which $R^1$ represents a member of the group consisting of an alkyl group, a cycloalkyl group, and an aryl group by a typical Grignard reaction to produce a pentamethylcyclopentenyl carbinol also having a methyl group and the $R^1$ group combined with the carbon atom which is joined to the cyclopentenyl ring and to the hydroxyl groups.

The nature of the present invention is illustrated further by the following example which should not be misconstrued to limit unduly the generally broad scope of the invention.

Mesityl oxide was reduced in wet ether solution by an aluminum-mercury couple to give a 60% yield of desoxymesityl oxide based upon the amount of mesityl oxide converted. In a typical preparation 200 grams of aluminum foil was converted into the aluminum-mercury couple following the procedure described by Vogel, J. Chem. Soc. 130, 594, (1927). This aluminum-mercury couple was then placed in a 5-liter flask provided with a large reflux condenser and containing about 2 liters of ether saturated with water. To this mixture, in the 5-liter flask, 200 grams of mesityl oxide was then added. With an active aluminum-mercury couple, reaction began in a few minutes and reached a maximum in an hour or so and then gradually subsided after which about 100 grams of water was added while the vigorous boiling action continued in the reaction flask. After standing overnight, the ether was filtered from the solid which remained in the flask, was dried over calcium chloride and then distilled at atmospheric pressure to separate ether from the product, comprising essentially desoxymesityl oxide. A general summary of the production of desoxymesityl oxide is given in Table I.

Fractional distillation of the desoxymesityl oxide was accompanied by loss of weight at a temperature of about 150° which resulted in the formation of an olefinic ketone (B) which was probably a mixture of isomers with the olefinic double bond located at different positions in the 5-membered ring of the pentamethylcyclopentenylmethyl ketone.

Two reactions of pentamethylcyclopentenylmethyl ketone with methyl magnesium bromide were carried out. In one of these hydrochloric acid was used in the decomposition of the hydrolysis product of the Grignard reaction, that is, the reaction with methyl magnesium bromide and in that case the unstable unsaturated tertiary alcohol apparently dehydrated to form a diene. In the other reaction, of the pentamethylcyclopentenylmethyl ketone with methyl magnesium bromide, hydrolysis of the Grignard condensation product was carried out in the absence of hydrochloric acid and in this instance, the unsaturated tertiary alcohol of this invention was isolated.

For carrying out this Grignard reaction, methyl magnesium bromide was prepared from 10 grams (0.41 mols) of magnesium and 45 grams (0.47 mols) of methyl bromide using the usual technique for Grignard preparations. To the ether

TABLE I

Reduction of mesityl oxide with aluminum-mercury couple

| Run | 8 | 12 | 14 | 16 | 18 |
|---|---|---|---|---|---|
| Charge: | | | | | |
| Aluminum used in preparing couple, grams | 200 | 210+200 | 220 | 306+150 | 300+300 |
| Ether, liters | 2.7 | 3 | 3 | 4 | 4 |
| Mesityl oxide, grams | 202 | 210 | 225 | 306 | 300 |
| Water added, grams | 180 | 200+150 | 200 | 250 | 250 |
| Recovery: | | | | | |
| Ether-free product, grams | 190 | 175 | 195 | 300 | 295 |
| B. P. near mesityl oxide, grams | 43.5 | 118 | 123 | 86 | 49 |
| B. P. greater than mesityl oxide, grams | 146.5 | 52 | 72 | 214 | 246 |
| Loss, grams | 12 | 35 | 30 | 6 | 5 | solution of methyl magnesium bromide was added a solution of 50 grams (0.28 mols) of the pentamethylcyclopentenylmethyl ketone (B) in 300 ml. of ether. Stirring was continued for 2 hours while gently heating the reaction flask. Ice was then added to decompose the addition product and hydrochloric acid finally used to dissolve the magnesium oxide and clarify the solution. The ether solution was separated from the aqueous layer, then water washed several times, dried over K₂CO₃, and concentrated under reflux.

51 grams of the product which was so obtained was fractionally distilled as indicated in Table II.

TABLE II

| Cut | B.P..₁ mm. °C. | Weight percent | $n_D^{20}$ | M. weight |
|---|---|---|---|---|
| 1 | 38 | 8.4 | 1.4623 | |
| 2 | 38–40 | 14.9 | 1.4624 | |
| 3 | [1] 40–40 | 9.2 | 1.4618 | |
| 4 | 40–40 | 19.5 | 1.4615 | [2] 177 |
| 5 | 40–41 | 11.4 | 1.4623 | |
| 6 | 41–50 | 13.3 | 1.4656 | |
| 7 | 50–55 | 6.3 | 1.4723 | |
| Bottoms | | 17.0 | 1.5056 | |

[1] B. P. converted to 760 mm. by Lippincott chart is 200.
[2] Calculated for C₁₃H₂₄O, 196; for C₁₃H₂₂, 178.

From the results given in Table II, it is noted that the product isolated was an olefinic hydrocarbon rather than the tertiary carbinol product of the Grignard reaction.

Accordingly, the Grignard reaction of methylmagnesium bromide with the dehydration product of desoxymesityl oxide was carried out again by using the same amounts of magnesium (10 grams) and methyl bromide (45 grams). Likewise 50 grams (0.28 mols) of pentamethylcyclopentenylmethyl ketone was used in preparing the addition compound. After the decomposition of the addition product with ice, the ether solution was decanted from the precipitated magnesium oxide and more ether was used in the absence of magnesium oxide. The ether solution was washed with water, then dried, and concentrated to give 51 grams of product which was finally distilled as indicated in Table III.

TABLE III

| Cut | B. P..₁ mm. °C. | Corrected B. P..₇₆₀ | Weight percent | $n_D^{20}$ |
|---|---|---|---|---|
| 1 | 50–60 | 210–230 | 6.7 | 1.4798 |
| 2 | 60–61 | 230–232 | 11.3 | 1.4775 |
| 3 | 61–62 | 232–236 | 17.7 | 1.4766 |
| 4 | 62–62 | 236–236 | 23.5 | 1.4771 |
| 5 | 62–85 | 236–272 | 22.0 | 1.4775 |
| 6 | 85–151 | 272–367 | 11.4 | 1.4875 |
| 7 | 151–159 | 367–373 | 5.1 | 1.5086 |
| 8 | 159–160 | 373–375 | 1.5 | 1.5078 |
| Bottoms | | | 1.8 | |

| | Elementary Analysis Found for Blend of Cuts 2, 3, 4 | Calc. for C₁₃H₂₄O |
|---|---|---|
| Mol. weight | 196 | 200 |
| Percent C | 79.43 | 79.43 |
| Percent H | 12.30 | 12.32 |
| $D_4^{20}$ | 0.885 | |

The blend of cuts 2, 3, and 4 of the product reacted instantly with potassium permanganate solution as would be expected of an unsaturated alcohol. This material had a pleasant pine-forest like odor. Infrared determinations on the blend of cuts 2, 3, and 4 and ultraviolet analysis gave results in accord with the structure of pentamethylcyclopentenyldimethyl carbinol, that is, a cyclic unsaturated tertiary alcohol.

I claim as my invention:

1. A carbinol having a structural formula selected from the group consisting of

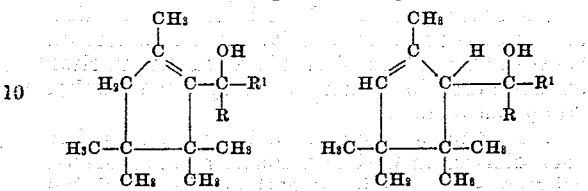

and

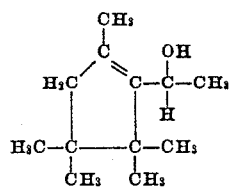

wherein R represents a member of the group consisting of hydrogen and an alkyl group and R¹ represents a member of the group consisting of an alkyl group, a cycloalkyl group, and an aryl group.

2. A carbinol as defined in claim 1 further characterized in that R¹ represents an alkyl group.

3. A pentamethylcyclopentenyl carbinol having the structural formula

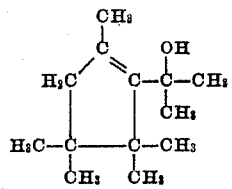

4. A pentamethylcyclopentenyl carbinol having the structural formula

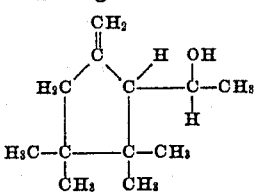

5. A carbinol having the structural formula

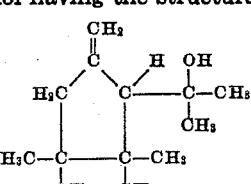

6. A carbinol having the structural formula

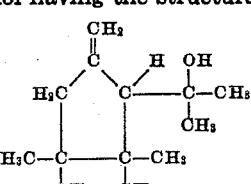

7. A compound containing a 5-membered carbon atom ring having a double bond, there being two methyl groups attached to each of two adjacent carbon atoms of said ring, a carbinol group attached to a third carbon atom of the ring and an additional methyl group attached to a nuclear carbon atom adjacent said third carbon atom in the ring, the remaining carbon atom of the ring having hydrogen attached thereto and said carbinol group having its hydroxyl group and at least one alkyl group bound to the carbon atom which is attached to said ring.

8. A compound as defined in claim 7 further characterized in that said double bond is located between said third carbon atom and the nuclear carbon atom to which said additional methyl group is attached.

9. A compound as defined in claim 7 further characterized in that said double bond is located between said remaining carbon atom and the nuclear carbon atom to which said additional methyl group is attached.

10. A compound containing a cyclopentyl ring having two methyl groups attached to each of two adjacent nuclear carbon atoms, a carbinol group attached to a third nuclear carbon atom and a $CH_2$ group attached by a double bond to a nuclear carbon atom adjacent said third carbon atom, the remaining carbon atom of said ring having two hydrogen atoms attached thereto and said carbinol group having its hydroxyl group and at least one alkyl group bound to the carbon atom which is attached to said ring.

CARL B. LINN.

REFERENCES CITED

The following references are of record in the file of this patent:

Whitmore, "Organic Chemistry," published by D. Van Nostrand Co., New York (1937), page 277 (1 page only).